United States Patent
Hahn

[15] 3,651,897
[45] Mar. 28, 1972

[54] CALIPER TYPE BRAKE STRUCTURE
[72] Inventor: Emil H. Hahn, St. Joseph, Mich.
[73] Assignee: Lambert Brake Corporation, St. Joseph, Mich.
[22] Filed: May 4, 1970
[21] Appl. No.: 34,393

[52] U.S. Cl. .............................. 188/72.2, 188/72.7, 188/72.9
[51] Int. Cl. ............................................................. F16d 55/46
[58] Field of Search .............................. 188/72.2, 72.7, 72.9

[56] References Cited

UNITED STATES PATENTS

| | | | |
|---|---|---|---|
| 2,655,229 | 10/1953 | Eksergian | 188/72.2 |
| 3,211,261 | 10/1965 | Chouings | 188/72.9 |
| 3,314,506 | 4/1967 | Belart et al. | 188/106 F X |
| 3,463,274 | 8/1969 | Hollnagel et al. | 188/72.7 |

FOREIGN PATENTS OR APPLICATIONS

| | | | |
|---|---|---|---|
| 1,489,537 | 6/1967 | France | 188/72.2 |
| 1,005,382 | 9/1965 | Great Britain | 188/72.2 |

*Primary Examiner*—George E. A. Halvosa
*Attorney*—Olson, Trexler, Wolters & Bushnell

[57] ABSTRACT

The brake unit as described herein is a caliper disc brake to be mounted in relationship to a driving disc which may be fixed or slideably mounted to a shaft or other driving means, which driving means is capable of imparting rotation to the disc. The caliper disc brake assembly is provided for stopping the rotation of the driving disc by utilizing externally applied actuating or energizing force and automatically applied internal actuating or energizing force.

7 Claims, 10 Drawing Figures

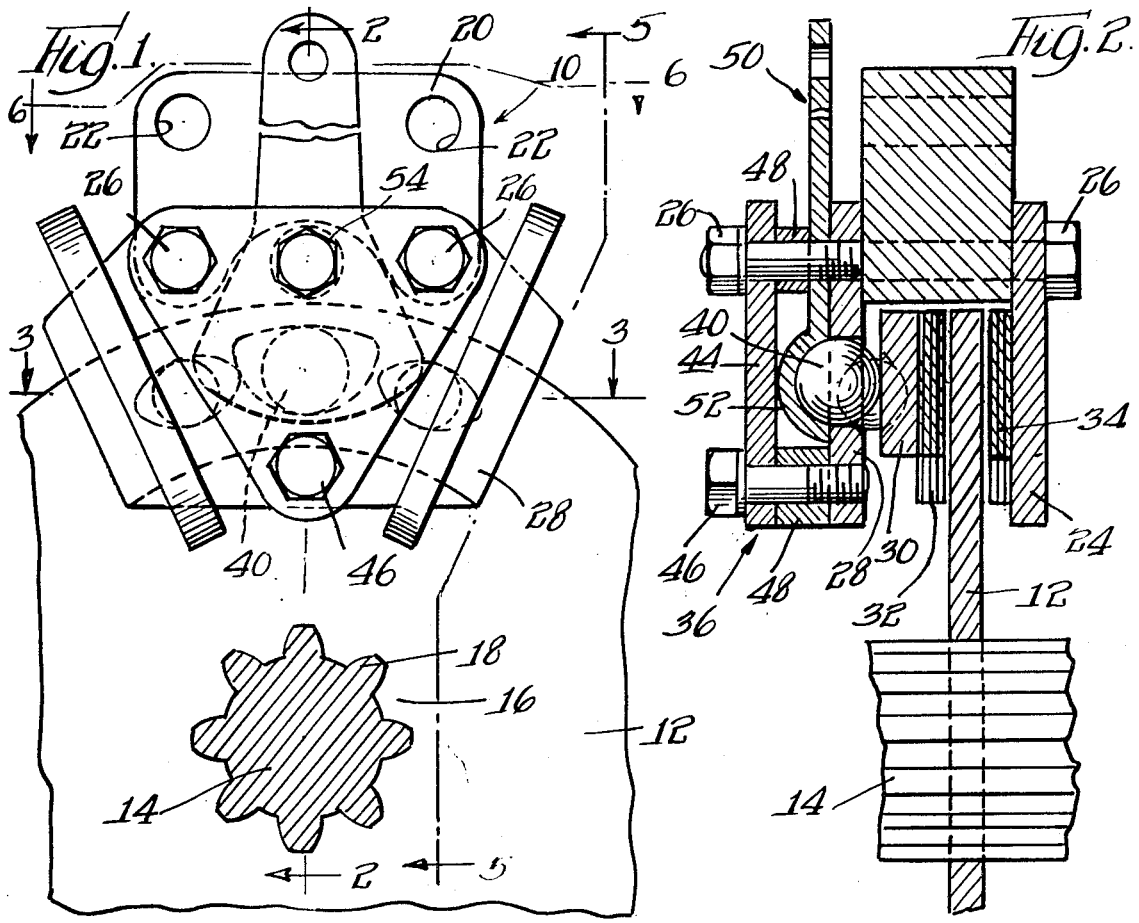
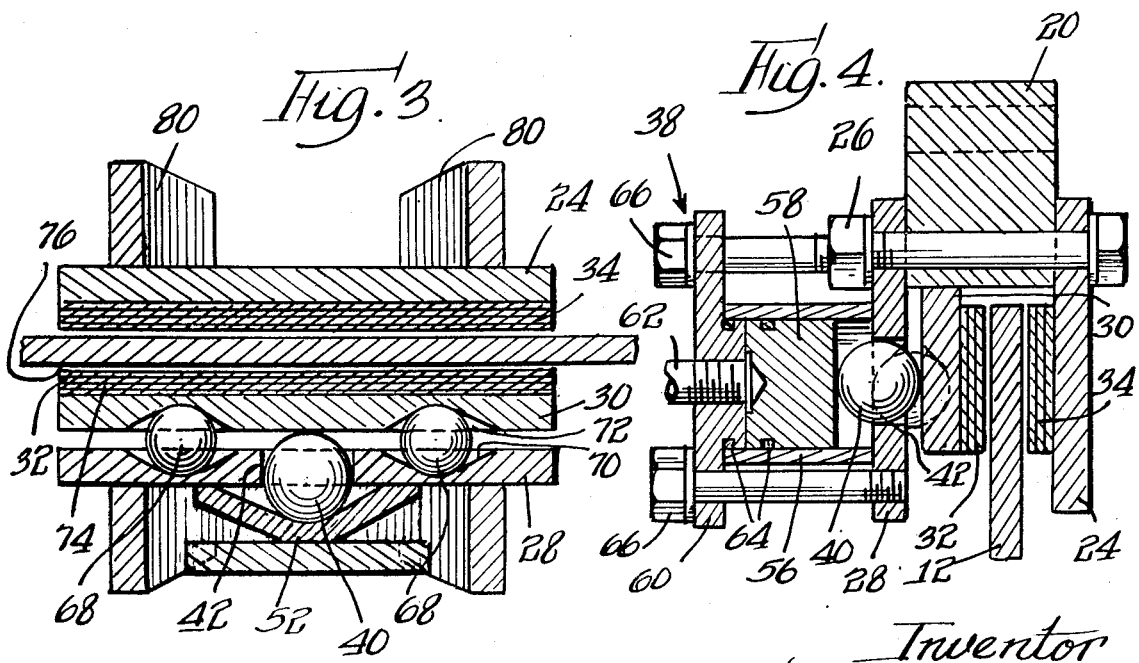

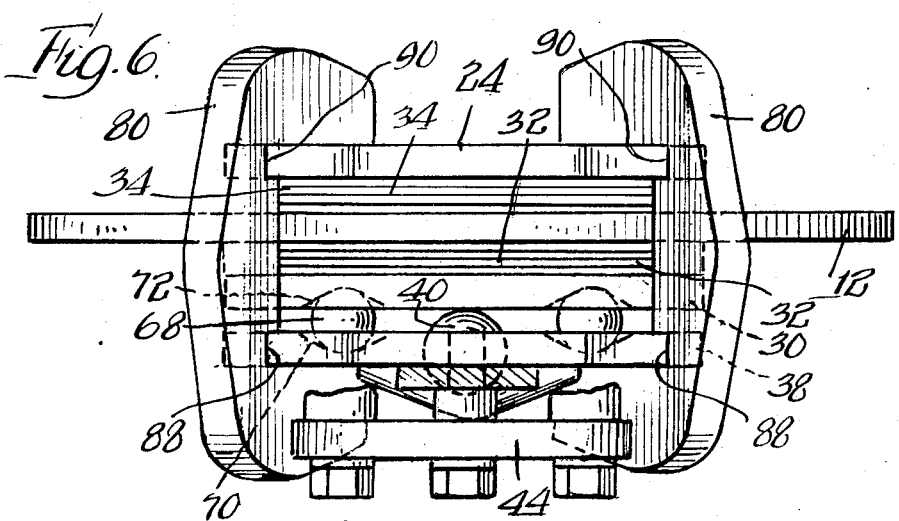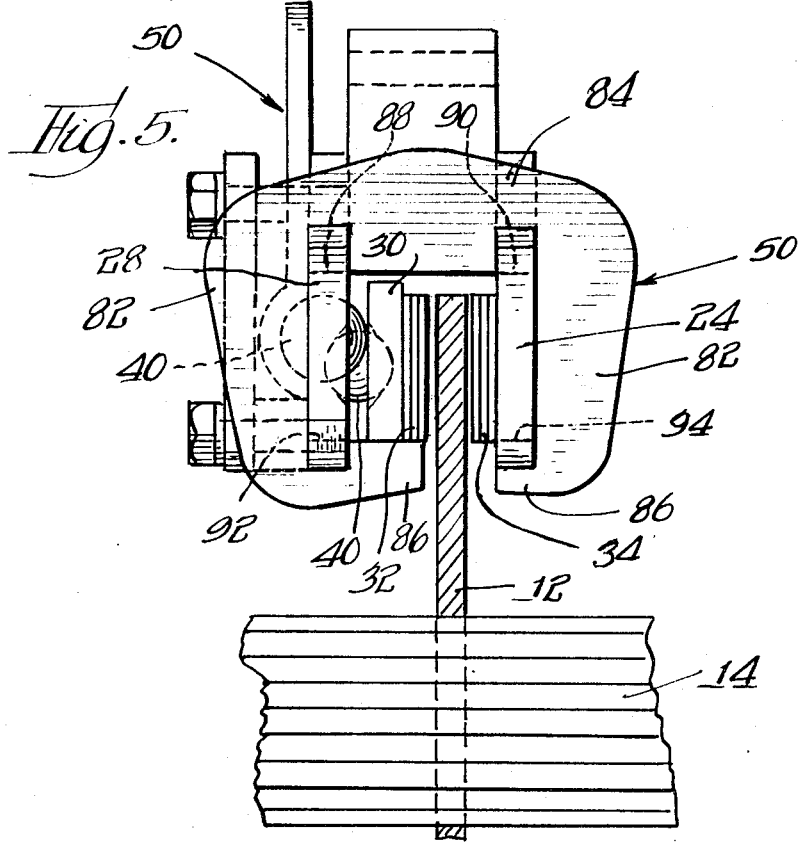

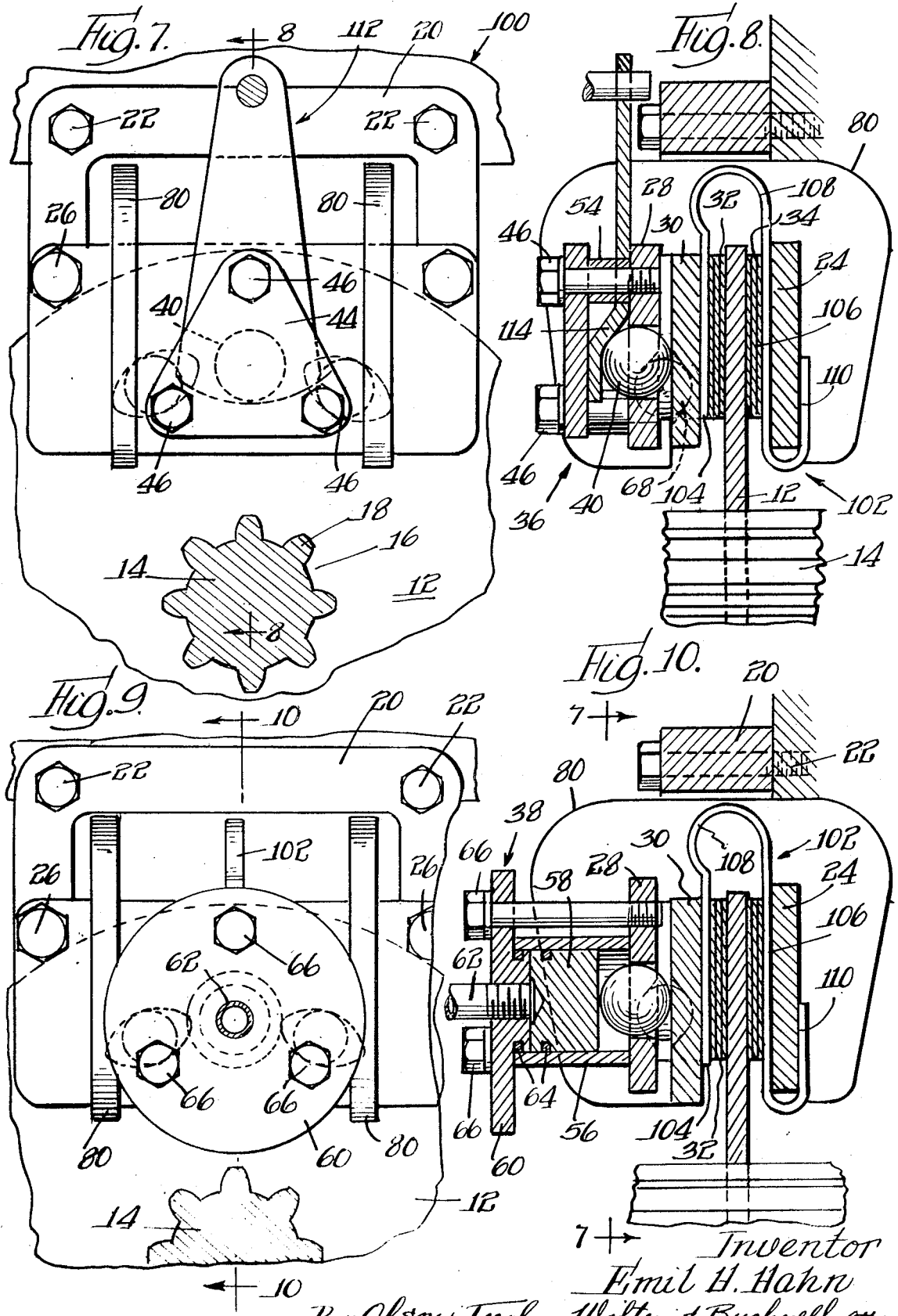

3,651,897

CALIPER TYPE BRAKE STRUCTURE

SUMMARY OF THE INVENTION

The present invention relates to a novel friction device, and more specifically to a novel brake structure.

OBJECTS AND BRIEF DESCRIPTION OF THE DRAWINGS

An important object of the present invention is to provide a novel brake assembly adapted to embrace and engage areas of a rotary member to be controlled, which unit may be selectively actuated mechanically or with fluid under pressure.

A more specific object of the present invention is to provide a novel caliper type brake assembly which may be actuated with hydraulic or mechanical means.

A further specific object of the present invention is to provide a novel caliper type brake assembly of the above-described type which in addition to having hydraulic or mechanical actuating means, includes a self-actuating mechanism.

Yet another object of the present invention is to provide a novel caliper type brake assembly of the above-described type which is automatically repositioned in a non-actuating position when the hydraulic or mechanical actuating means is released.

A further object of the present invention is to provide a novel caliper brake assembly of the above-described type which is of relatively simple, economical and efficient construction.

Other objects and advantages of the present invention will become apparent from the following description of the accompanying drawings wherein:

FIG. 1 is a front sectional view showing one embodiment of the caliper brake assembly incorporating the features of the present invention associated with a rotatable member to be controlled;

FIG. 2 is a fragmentary sectional view taken generally along line 2—2 of FIG. 1 and including a mechanical external actuating mechanism;

FIG. 3 is a further fragmentary sectional view taken along lines 3—3 of FIG. 1;

FIG. 4 is a still further fragmentary sectional view taken along lines 2—2 of FIG. 1 and including a hydraulic external actuating mechanism;

FIG. 5 is a side view of caliper caliper brake assembly taken along lines 5—5 of FIG. 1;

FIG. 6 is a fragmentary sectional view taken along lines 6—6 of FIG. 1;

FIG. 7 is a partial front view showing a second embodiment of the caliper brake assembly incorporating features of the present invention associated with a rotatable member to be controlled;

FIG. 8 is a cross-sectional view taken along lines 8—8 of FIG. 7 and including a mechanical external actuating mechanism;

FIG. 9 is a partial front view of the caliper brake assembly including a hydraulic external actuating mechanism of FIG. 7; and, FIG. 10 is a cross-sectional view taken along lines 10—10 of FIG. 9.

DETAILED DESCRIPTION

Referring to the drawings and specifically FIGS. 1 to 6, wherein like parts are designated by the same numerals throughout the figures, the caliper brake assembly 10 incorporating features of the present invention is shown in assembled relationship with a rotary member or driving disc 12. The driving disc 12 is fixed on a rotatable shaft 14 which may, for example, be an axle of a small vehicle, truck or the like, the rotatable shaft 14 imparting rotation to the driving disc 12. The rotary member or driving disc 12 and the shaft 14 might also be parts of various pieces of machinery as well as parts of a vehicle. In other words, the caliper brake assembly may be adapted for stopping any desired rotatable member.

The driving disc 12, in addition to being fixed to the rotatable shaft 14 for rotation therewith, may be either rigidly held in place or slideable along the longitudinal axis of the shaft. In the latter case, the driving disc 12 and rotatable shaft 14 would include a plurality of complementary splines 16 and 18 respectively which cooperate with each other for allowing the driving disc to slide axially along the shaft. In a caliper brake assembly of the type described herein, if the driving disc 12 is rigidly fixed to the rotatable shaft 14, the caliper brake assembly must be slideably mounted in a manner and for reasons described hereinafter. On the other hand, if the driving disc is slideably mounted to its associated rotatable shaft the caliper brake assembly must be rigidly held in place.

The caliper brake assembly 10 comprises a mounting bracket 20 for suitably mounting the assembly adjacent a portion of the periphery of driving disc 12 as best seen in FIG. 1. The caliper brake assembly can be slideably mounted on pins or bars (not shown) through bores or holes 22 of mounting bracket 20, the assembly being slideable in a direction transverse to the driving disc 12 as best seen in FIGS. 1 and 2. This would be necessary, as stated above, if the driving disc 12 were rigidly fixed to the rotatable shaft 14. On the other hand, if the driving disc 12 is slideably mounted to rotatable shaft 14, the mounting bracket 20 and therefore the caliper brake assembly 10 can be bolted to a portion of the associated machine by means of these same holes or bores.

A fixed actuating plate or end plate 24 is positioned on one side of the driving disc 12 and in confronting relationship therewith, the fixed actuating plate extending along a portion of the periphery of driving disc 12. The fixed actuating plate is rigidly mounted on one end thereof to one side of the mounting bracket 20 by a common bolt 26, the mounting bracket laterally spacing the fixed actuating plate a predetermined distance from the driving disc 12 as seen in FIG. 2.

A secondary plate 28 is positioned on the opposite side of driving disc 12 and in direct alignment with the fixed Actuating plate on end plate 24. The secondary plate is mounted on one end thereof to the opposite side of mounting bracket 20 by common bolts 26 which extend entirely through the mounting bracket as seen in FIG. 2. With the secondary plate 28 and the end plate 24 mounted to the mounting bracket 20 in the manner just described, the plates are rigidly held a predetermined distance apart by the mounting bracket.

A movable actuating plate or primary plate 30 is positioned directly between the driving disc 12 and secondary plate 28, the primary plate being held in this position solely by a self-actuating or energizing mechanism to be described hereinafter. The primary plate 30 is positioned for movement in a direction transverse to the driving disc 12 so that a frictional lining located thereon can engage or come in contact with the driving disc. Attached to the inner surface of primary actuating plate 30 by some conventional method, bonding, riveting, molding or the like, is one of a pair of opposed frictional linings 32 and 34 respectively, its complementary lining being attached in the same manner to fixed actuator plate or end plate 24. As seen in FIG. 2, the frictional linings 32 and 34 are in non-contacting relationship with the driving disc 12. As will be described hereinafter, when the caliper brake assembly is actuated or energized causing the primary plate to move toward the driving disc, frictional lining 32 engages the disc which ultimately causes both frictional linings to engage the disc and thereby stop its rotation.

The caliper brake assembly 10 can be readily adapted for external actuation or energization by either a mechanical mechanism 36 shown in FIG. 2 or a hydraulic mechanism 38 shown in FIG. 4. A solid hard ball 40 made of steel or the like is movably held within a bore or hole 42 in the secondary plate 28. The ball is provided for transmitting an applied force to the primary plate 30 so as to cause the primary plate to move towards the driving disc 12, the frictional lining 32 thereby initially engaging the driving disc. Upon engagement with the rotating driving disc 12, the primary plate 30 and friction lining 32 begin to rotate in the same direction. As will be described in detail hereinafter, upon this initial movement of the primary plate, the self-actuating mechanism to be described below causes the friction lining 32 to further engage the driving disc 12 and in addition causes the friction lining 34 to engage the opposite side of the driving disc. With both friction linings appropriately engaged with the driving disc, the driving disc is caused to stop which in turn causes the axial rotation of rotating shaft 14 to stop.

Turning specifically to FIG. 2, the external mechanical actuating device or mechanism 36 is shown and includes a triangular back up or lever plate 44 which is positioned in confronting relationship with and laterally spaced from the secondary plate 28. The lever plate is mounted to the secondary plate by a bolt 46 and previously described bolts 26. The bolt 46 passes through the lower vertex of the triangular lever plate and thereafter through one of three spacers 48 and into the secondary plate as seen in FIGS. 1 and 2. The previously described bolts 26 in addition to extending through end plate 24, mounting bracket 20, and secondary plate 28 extend through spacers 48 and lever plate 44 at the upper vertices of the lever plate as seen in FIG. 1.

The external mechanical actuating device 36 further includes a longitudinally extending mechanical lever 50 which contains a substantial conical or generated ball seat 52 at its lower end, the ball seat being shaped so as to co-operate with external actuating ball 40 in a manner to be described hereinafter. The mechanical lever is pivotably mounted to and between the lever plate 44 and secondary plate 28 by a spacer pin 54 which can best be seen in FIG. 1. The ball seat 52 is positioned adjacent to and faces the hole or bore 42 in secondary plate 28 and aids in supporting external actuating ball 40, the outwardly extending external surface of the ball seat resting adjacent the back up or lever plate 44 as seen in FIG. 2. The other end of mechanical lever 50 extends outward from between the lever plate and secondary plate so that a manually applied force can be exerted thereto.

Operationally, a lateral force is applied to the free or outwardly extending end of mechanical lever 50, that is the free end of lever 50 is pulled either to the left or the right as viewed in FIG. 1 which in turn causes the lever to pivot about the longitudinal axis of spacer pin 54. As the mechanical lever pivots, the ramp of ball seat 52 rides up on external actuating ball 40 and through it translates the laterally applied force to a force perpendicular to primary plate 30. Reaction to this perpendicular or normal force is taken by the contact of the back of the ball seat or lever plate 44. As stated above, this perpendicular or normal force applied to the primary actuating plate 30 causes the plate to move towards the driving disc 12 so that friction lining 32 may engage the driving disc.

Turning now to FIG. 4, the external hydraulic actuating device or mechanism is shown and may easily replace the above described mechanical actuating device or mechanism 36. The hydraulic actuating device comprises a hydraulic actuated piston and cylinder assembly including an open ended cylinder 56 which serves as a spacer and which has one open end positioned in contacting relationship with secondary plate 28 and entirely encompasses bore or hole 42. The piston and the cylinder assembly further includes a piston 58 which is mounted for axial movement within cylinder 56, one end of the piston aiding in supporting external actuating ball 40 as seen in FIG. 4. A cylinder cap 60 is mounted to the otherwise free end of cylinder 56 and includes an opening therein which provides for connection to a conventional hydraulic source, only the hydraulic line 62 being shown. A pair of O-rings 64 are provided for sealing the hydraulic fluid between the piston 58 and cylinder cap 60. The mechanical actuating device or mechanism is bolted to the secondary plate 28 by three radially spaced screws 66 (only two being shown) which extend through the cylinder cap 60 and are threaded into co-operating holes or bores in the secondary plate. In this case the above described bolts 26 do not aid in supporting the hydraulic actuating device and therefore may be shorter in length than those described with respect to FIG. 2.

Operationally, the hydraulic actuating device or mechanism provides the same ultimate function as that of the mechanical actuating mechanism. However, instead of using a manually applied lateral force as described above, the hydraulic actuating device or mechanism uses a hydraulically applied perpendicular or normal force for driving the external actuating ball 40 into the primary plate 30.

Referring now specifically to FIGS. 3, 6 and 9, the previously mentioned self-energizing mechanism will be described in detail. The self-energizing mechanism includes a plurality of hard balls 68 which may be made of steel or the like. The embodiments herein disclosed utilize two such balls. However, it is to be understood that any reasonable number of balls may be provided. Each ball 68 is seated or positioned within a pair of complementary substantially conically shaped or generated depressions 70 and 72 in the secondary plate 28 and primary plate 30 respectively. A spring or springs (not shown) may be provided between the secondary plate 28 and primary plate 30 in order to keep the balls 68 positioned in the bottom of their respective depressions when the brake is not actuated. It is to be noted that the primary plate 30 and attached frictional lining 32 are supported entirely by the balls 68 on one side thereof and the driving disc 12 on the other side thereof, the primary plate being entirely free of the remaining structure. That is to say, if the balls 68 were removed the primary plate would drop downward as can readily be seen in FIG. 2. Being so supported, the primary plate 30 is easily movable towards and away from the driving disc 12 in a manner and for reasons described below.

Turning now to the operation of the self-energizing mechanism, it is firstly to be assumed that the driving disc 12 is mounted for slideable movement along the rotating shaft 14 and that the mounting bracket 20 is fixedly mounted in the manner described above. Upon applying a perpendicular or normal force on external actuating ball 40 in the manner described above, the friction lining 32 of primary plate 30 is moved into contact with one side of driving disc 12 which in turn is moved or slid so that its other side is in contacting relationship with the friction lining 34 of end plate 24, the running clearances 74 and 76 on each side of the rotating or driving disc 12 being absorbed by these movements. Friction lining 32 of the primary plate upon coming into frictional contact with the rotating driving disc 12 causes the primary plate to rotate in the same direction as that of the disc. This is quite possible since, as stated above, the primary plate is only supported by the balls 68 and the rotating or driving disc 12. As the primary plate rotates along with the driving disc 12, each ball 68 will tend to move, in a relative manner, up the opposed sides of its associated depressions 70 and 72 resulting in opposing perpendicular or normal forces being applied to the secondary plate. 28 and primary plate 30 respectively. These opposing forces create a spreading action between the secondary plate and the primary plate. However, since the secondary is rigidly fixed due to the mounting bracket 20 being rigidly fixed, this spreading action causes the friction lining 32 of primary plate 30 to further engage one side of the driving disc. As the primary plate continues to rotate along with the driving disc, the balls 68 move further up the opposed sides of their respective depressions which in turn results in a greater spreading action. Ultimately, the driving disc will be sufficiently squeezed or clamped by the friction linings 32 and 34 causing it to cease rotating and thereby stopping the rotating shaft 14.

Operation of the self-energizing mechanism, assuming a fixed driving disc 12 and a "floating" mounting bracket 20, is substantially the same as described above except that after the primary plate 30 moves up to absorb running clearance 74, the entire brake assembly "floating" on pins (not shown) in holes 22 of the mounting bracket moves to the left (as viewed in FIG. 2) until running clearance 76 is displaced by lining 34 of fixed end plate 24. With both running clearances absorbed, braking action follows in the same manner as described above.

Turning specifically to FIGS. 5 and 6, the caliper brake assembly 10 is shown to include two "C-shaped" calipers or clamps 80 which are laterally spaced and mounted to end plate 24 and secondary plate 28 in a manner to be described hereinafter. It is to be understood that while only two calipers are shown, the invention contemplates any reasonable number of laterally spaced calipers.

Each caliper 80 comprises two laterally spaced side portions 82 integrally connected at their respective ends by a web or upper portion 84. The otherwise free ends of side portions 82 include integrally connected and inwardly extending bottom portions 86. As seen in FIG. 5, the lower surface of web 84 of each caliper 80 is mounted within co-operating aligned slots 88 and 90 of the secondary plate 28 and the end plate 24 respectively, the inner surface of each side portion 82 being positioned in contacting relationship with the outer surface of the secondary plate and end plate respectively. The upper surfaces of inwardly extending portions 86 are mounted within aligned and laterally spaced slots 92 and 94 in the lower end of the secondary plate and end plate.

As described above, the end plate 24 and secondary plate 28 are held in spaced relationship by the mounting bracket 20 and are held together by bolts 26. The calipers or clamps 80 provide rigidity and resist the "spreading action" imparted to the secondary plate and end plate by the above described opposing forces of balls 68 during self-actuation. That is, all the reaction to the perpendicular or normal force is taken through the calipers and none is transmitted to the bolts 26. This provides for not only a rigid brake assembly but also a more reliable brake assembly.

Turning to FIGS. 7 through 10, a modified caliper brake assembly 100 is shown and is identical in many respects to the caliper brake assembly 10 described above. Therefore, those features which are identical in both embodiments will be designated by the same numerals and will not be discussed except where necessary. It will suffice merely to state that embodiment 100, like embodiment 10, may be provided with either an external mechanical actuating device or mechanism 36 (FIGS. 7 and 8) or an external hydraulic actuating device or mechanism 38 (FIGS. 9 and 10).

The main difference between the caliper brake assembly 100 and the caliper brake assembly 10 resides in a spring mechanism 102 which is provided by the assembly 100 for returning the primary plate 30 to its non-operating position after actuation or energization of the brake assembly ceases. That is, the spring mechanism repositions balls 68 into the bottom of their respective complementary depressions 70 and 72.

The spring mechanism 102, which is substantially U-shaped and made from a highly resilient material, comprises two laterally spaced and downwardly extending side portions 104 and 106 integrally joined at respective upper ends by a substantially curved web or upper portion 108. The free end of side portion 106 includes an upwardly extending and integrally connected bight 110 for aiding in supporting the spring mechanism in the manner described hereinafter.

The friction lining 32 of primary plate 30 and the friction lining 34 of end plate 24 include aligned vertically extending slots (not shown) which extend the entire length of their respective plates and are of approximately the same width as the spring mechanism 102. The side portions 104 and 106 of the spring mechanism are snugly mounted within respective slots of friction linings 32 and 34 so that the web or top portion 108 extends around and above the top of driving disc 12 as seen in FIGS. 8 and 10. The bight 110 is clamped around the bottom of end plate 24 for aiding in supporting the spring mechanism 102. The side portion 104 is spring biased in its vertically extending position as seen in FIGS. 8 and 10, that is in the caliper brake assembly non-operating position. Additionally, the side portion 104 and side portion 106 are spring biased away from each other so as to force their respective friction lining away from the sides of driving disc 12. This in turn insures positive running clearances between each side of the driving disc 12 and the friction linings 32 and 34 respectively whereas the caliper brake assembly 10 of FIGS. 1 to 4, without a spring mechanism 102, depends upon the "float-ing," or unrestricted movement, of the primary plate 30 for clearance.

As stated above, the spring mechanism 102 is used primarily for returning the primary plate 30 to its non-operating position after the brake assembly has stopped the driving disc 12 and rotating shaft 14. In operation the frictional contact of friction lining 32, attached to primary plate 30, with driving disc 12 imparts a lateral or rotational movement to the primary plate. As viewed in FIGS. 8 and 10, the direction of this lateral or rotational movement is either into or out of the drawing depending upon the driving disc's direction of rotation. As the primary plate moves along with the driving disc, it causes the side portion 104 of spring mechanism 102 to be driven therewith, the side portion being moved from its biased position. Upon release of the braking action, the biased side portion returns to its biased position and therefore returns the primary plate 30 to its original non-operating position. This in turn, repositions the balls 68 into the bottom of their respective complementary depressions and the brake assembly is again ready for actuation or energization.

The only other noted variation in the caliper brake assembly 100 as compared to the assembly 10 resides in the mechanical lever 112. This lever is a simplified version of mechanical lever 50 in assembly 10, the mechanical lever 112 utilizing a V-shaped groove 114 rather than a conically shaped or generated ball seat.

With both embodiments of the caliper brake assembly being described, it is to be noted that all components are simple in structure. That is, all the components making up either embodiment can be made by simple stamping or tubing methods. Machine operations are limited to threading holes and "drill pointing" the ball ramps. This in turn provides for an economical brake assembly.

While particular embodiments of the invention have been shown, it should be understood, of course, that the invention is not limited thereto since many modifications may be made. It is, therefore, contemplated to cover by the present application any such modifications as fall within the true spirit and scope of the appended claims.

The invention is claimed as follows:

1. A caliper brake assembly for retarding the rotation of a disc mounted on a rotating shaft comprising mounting means for mounting said assembly adjacent a peripheral portion of the disc and including caliper means for embracing the disc, first and second plate means respectively positioned on opposite sides of said disc and supported by said mounting means for engagement with said disc during energization of said assembly, said first plate means being supported for limited rotative movement with said disc, secondary plate means fixed to said mounting means and positioned adjacent to and in confronting relationship with said first plate means, said secondary plate means including bore means therethrough having a wall, a ball movable axially within and retained by said bore means and engaging said wall and said first plate means, force application means axially spaced from said bore and engaging said ball for axially shifting said ball and initially moving said plate means into engagement with said disc whereby said disc imparts limited rotational movement to said first plate means, automatic brake actuating means comprising opposing cam surfaces on said first plate means and said secondary plate means and ball means between and engaging said surfaces and responsive to said limited rotational movement for forcing said first plate means into further engagement with said disc, and said caliper means being connected to and preventing spreading of said secondary plate means and said second plate means.

2. A caliper brake assembly according to claim 1 wherein said force application means includes longitudinally extending mechanical lever means engaging said ball, said lever means being manually movable for forcing said ball against said first plate means.

3. A caliper brake assembly according to claim 1 wherein said force application means includes hydraulic means for hydraulically forcing said ball against said first plate means.

4. A caliper brake assembly according to claim 1 wherein said mounting means is mounted for movement transversely with the sides of said disc and said disc is rigidly fixed to said rotating shaft, said mounting means being moved by said automatic brake actuating means for moving said second plate means into engagement with said disc during brake energization.

5. A caliper brake assembly according to claim 1 wherein said mounting means is rigidly mounted adjacent a predetermined peripheral portion of said disc and said disc is slideably mounted to said rotating shaft for movement along the rotating shaft, said external brake actuating means moving said disc into engagement with said rotating disc along with said first plate means.

6. A caliper brake assembly according to claim 1 including spring biasing means operatively connected to said first plate means for spring biasing said first plate means in a de-energized position, said spring biasing means moving with said first plate means during initial brake energization and automatically returning said first plate means to its deenergized position when the rotation of said disc ceases.

7. A caliper brake assembly according to claim 6 wherein said spring biasing means is operatively connected to said second plate means for biasing said first and second plate means away from said disc during brake de-energization whereby adequate clearances are maintained for rotation of said disc along with said rotating shaft.

* * * * *